428-919 SR
PM014 XR 4,005,429

United States Patent [19]

Ikrath et al.

[11] 4,005,429

[45] Jan. 25, 1977

[54] CAMOUFLAGED VHF ANTENNA

[75] Inventors: Kurt Ikrath, Elberon; William Kennebeck, Sea Bright, both of N.J.; Edward C. Shaffer, Augusta, Ga.; Peter J. Pingitore, Wayside, N.J.

[73] Assignee: The United States of America as represented by the Secretary of the Army, Washington, D.C.

[22] Filed: Oct. 8, 1975

[21] Appl. No.: 620,684

[52] U.S. Cl. ................................ 343/713; 343/768

[51] Int. Cl.[2] ......................................... H01G 1/32

[58] Field of Search .......... 343/767, 768, 769, 711, 343/712, 713

[56] References Cited

UNITED STATES PATENTS

| | | | |
|---|---|---|---|
| 2,063,531 | 12/1936 | Tuttle | 343/713 |
| 3,056,130 | 9/1962 | Charman | 343/767 |
| 3,210,766 | 10/1965 | Parker | 343/712 |

*Primary Examiner*—Craig E. Church

*Attorney, Agent, or Firm*—Nathan Edelberg; Jeremiah G. Murray; Frank J. Dynda

[57] ABSTRACT

A camouflaged VHF antenna for military vehicles. A false roof is fitted to the roof of the vehicle's metal shelter. The false roof includes a U-shaped slot which is parallel to the left and right edges and the rear edge of the vehicle roof. The slot is fed at the center of the U and tuning circuits are connected to the left and right edges of the slot.

6 Claims, 6 Drawing Figures

POLAR CHART

ROOF SLOT
RIGHT CORNER FED

CAMOUFLAGED VHF ANTENNA

GOVERNMENT LICENSE

The invention described herein may be used by or for the Government for governmental purposes without the payment of any royalties thereon or therefor.

BACKGROUND OF THE INVENTION a. Field of the Invention

Broadly speaking, this invention relates to antennas. More particularly, in a preferred embodiment, this invention relates to a camouflaged slot antenna for use at VHF frequencies.

b. Discussion of the Prior Art

The tactical need for low profile or camouflaged antennas on vehicles has been clearly demonstrated during recent military conflicts. Whip antennas can easily be sighted and destroyed by enemy fire, thereby preventing the vehicle's personnel from communicating and coordinating with other friendly elements. The vulnerability of conventional whip antennas on tanks, personnel carriers, communications trucks and other vehicles has limited the combat effectiveness of forward units in battle.

Another problem is that most vehicles requiring camouflaging are employed by the lower echelons which, at the present time, utilize VHF radio communications networks. Thus, with vehicles communicating at frequencies between 30 MHZ and 80 MHZ, the dimensions of the vehicles are comparable enough to a signal wavelength to make placement of non-conventional, camouflaged, antennas critical.

It is known that in the MF and HF bands a vehicle or helicopter itself can be used as a large radio antenna rather than as a counterpoise for a conventional whip antenna. The problem, then, is to devise a camouflaged VHF antenna for a military vehicle, or the like, in which the dimensions of the vehicle assist rather than hinder propagation.

SUMMARY OF THE INVENTION

The above problem has been solved by the instant invention in which the vehicle is fitted with a false, metal roof which is substantially co-extensive and coplanar with the roof of the vehicle.

The false roof is spaced-apart from the actual roof and includes a U-shaped slot parallel to the left, right and rear edges of the false roof. The above defined antenna includes means for energizing the slot with a source or r.f. energy and means for tuning the slot whereby a controlled radiation pattern at the frequency of interest is attained.

The invention and its mode of operation will be more fully understood from the following detailed description when taken with the accompanying drawings, in which:

DETAILED DESCRIPTION OF THE INVENTION

The invention will now be described with reference to a military pick-up truck equipped with a metal shelter. One skilled in the art will appreciate that the invention is not so limited and, with appropriate modifications, may be used equally well with tanks, personnel carriers, aircraft, et cetera.

Figure 1:
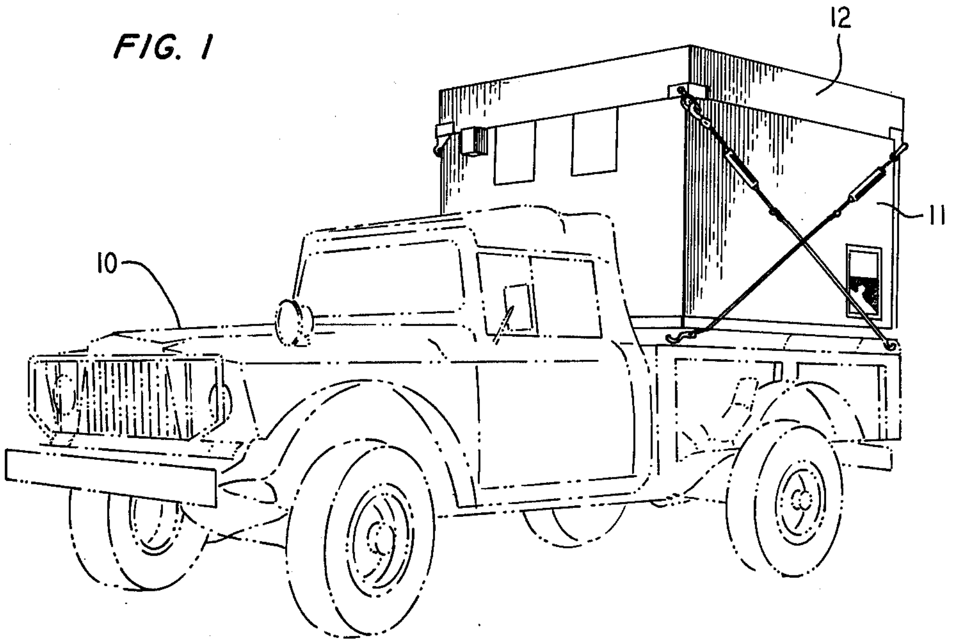
FIG. 1 is an isometric view of an illustrative pick-up truck fitted with a false roof antenna according to the invention.

As shown in FIG. 1, a truck 10 is equipped with a conventional metal shelter 11 which, in this instance, houses the VHF transmitters and receivers as well as the personnel required to operate the same. As will be more fully explained below, shelter 11 is equipped with a false roof 12 which houses the camouflaged antenna.

Figure 2:
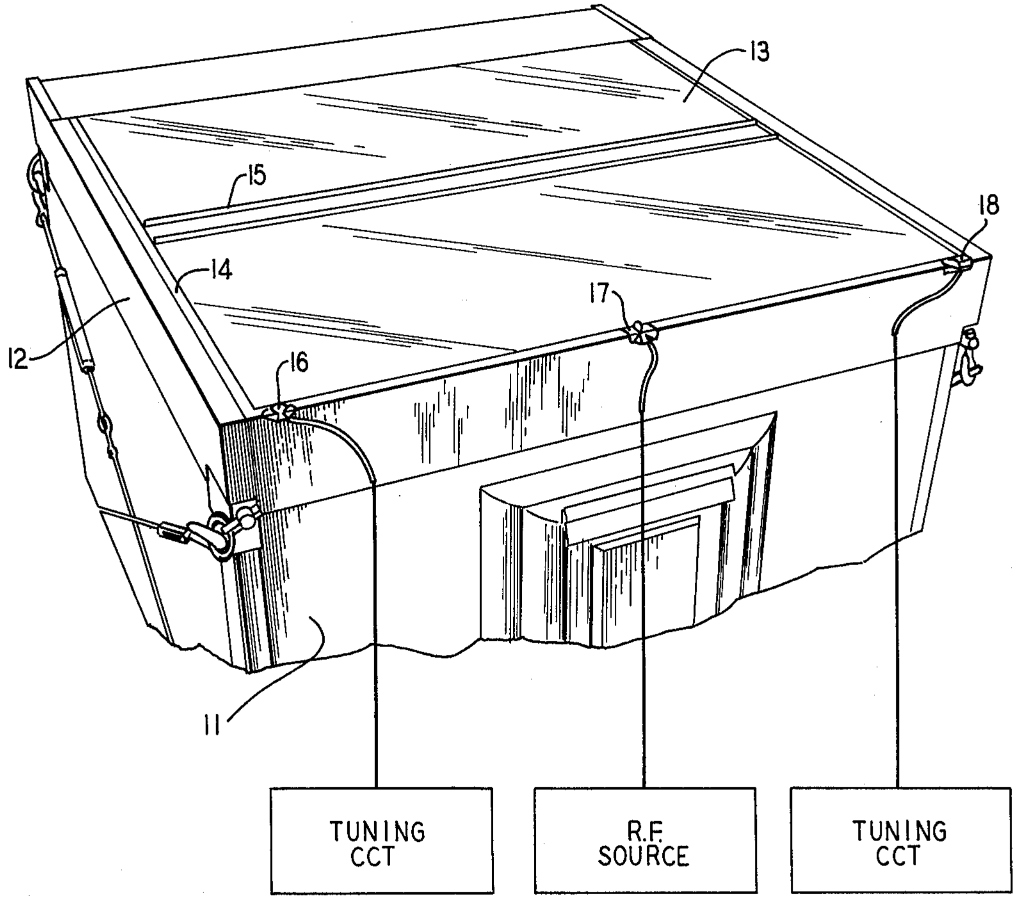
FIG. 2 is an isometric view of the roof of the truck shown in FIG. 1 and depicts the false roof antenna in greater detail.

As shown more clearly in FIG. 2, false roof 12 comprises a rectangular metal frame supporting a flat metal plate 13. The dimensions of plate 13 are such that a U-shaped slot 14 is formed along the sides and rear edge of roof 12. A beam 15 prevents plate 13 from sagging. Slot 14 is insulated from the frame of false roof 12 by a plastic member, for example, comprised of Lucite. Three co-axial cables lead, respectively, to the center 17 and the right and left corners 16, 18 of the slot. As will be explained, the co-axial feeds to locations 16 and 18 are used for the remote tuning of the slot while the feed to location 17 is used to energize the slot.

As is well known, a conventional slot antenna is intended to serve as a radiating element and for this purpose an attempt is made to approach, as closely as possible, the design conditions expressed by Babinet (see, for example, H. G. Booker, "Slot Aerials and Their Relations to Complementary Wire Aerials", *JIEE*, London, Vol. 93, Part III A, pp 620–626, 1946). In other words, the counterpoise structure of the slot aperture must be plane, infinitely large, infinitely conductive, and infinitesimally thin. Practical realization of these ideal conditions is to some extent facilitated by the fact that slot antennas are generally used where highly directional radiation patterns are required. This is accomplished by incorporating a tuned cavity into the counterpoise structure of the slot such that radiation from the slot into the cavity is reflected back through the slot aperture into open space. A tuned cavity implies that the dimensions of the cavity behind the slot antenna are dictated by the wavelengths of the cavity modes at the operating frequency of the slot antenna. It follows, then, that the dimensions of the cavity along the plane of the slot aperture must be larger than the dimensions of this aperture and that the dimensions of the cavity perpendicular to the aperture must be such that the reflected wave from the back of the cavity arrives in phase with the primary wave at the aperture so that radiation from the aperture is reenforced by the cavity. This means that the dimension of the cavity perpendicular to the aperture plane must be in the order of a quarter wavelength at the respective cavity mode if the slot aperture is to be the radiating element and the cavity the reactive tuning element for the slot. Under these circumstances, the slot antenna will radiate a highly directional radiation pattern into the free half-space in front of the slot aperture.

It will be apparent, however, that the false roof slot antenna disclosed in FIGS. 1 and 2 is not a slot antenna in the conventional sense. By way of contrast to a conventional slot antenna, in the instant invention it is not the aperture of the slot which emits the radiation but rather the surface of the vehicle which acts as the radiating element. Consequently, slot 14 in false roof 12 has approximately the same dimensions as shelter 11 and conforms to the shape of the shelter. Further, the slot is not located in the plane, center-portion of the false roof but at the edges of the roof.

In the illustrative example, the dimensions of slot 14 were 2.4 meters along the left and right edges and 1.9 meters along the rear edge. Thus, the 6.7 meter U-shaped slot acts as the coupling transformer between the transmitter located within the truck and the radiating element, i.e., the metal surfaces of the vehicle.

The separation between the actual roof of the shelter and the false roof is, in the illustrative embodiment, only 20 cm., that is, only a fraction of the wavelength of interest.

The cavity between the false roof and the actual roof of the truck, or rather the inner walls of this cavity, form a parasitic load inductance which is in shunt with the "Slot Inductance", as seen from the center feed terminal 17 of the slot. In this connection, consider that in the illustrative embodiment the 6.7 meter overall length of slot 14 corresponds to the half wavelength in air of a 22.5 MHZ signal. Consequently, the 20 cm depth of the cavity between the actual and the false roof amounts to only 0.2/13.4 = 0.015 of the wavelength. The shunt inductance loading of the slot by this cavity is reflected in the lowest resonant frequency of the slot vehicle structure which is approximately 30 MHZ, i.e., at the lower end of the operating band typically employed in military communications. Hence, unlike conventional slot antennas which are typically operated at about their $\lambda/2$ resonant frequency, as determined essentially by the slot dimensions, the false-roof slot-coupled vehicle disclosed herein is operated above the first resonant frequency over the entire low VHF band.

The matching and tuning circuits for the slot antenna depend on the frequency of operation and comprise conventional R, L and C elements. They are, thus, not discussed in detail.

Figure 3:
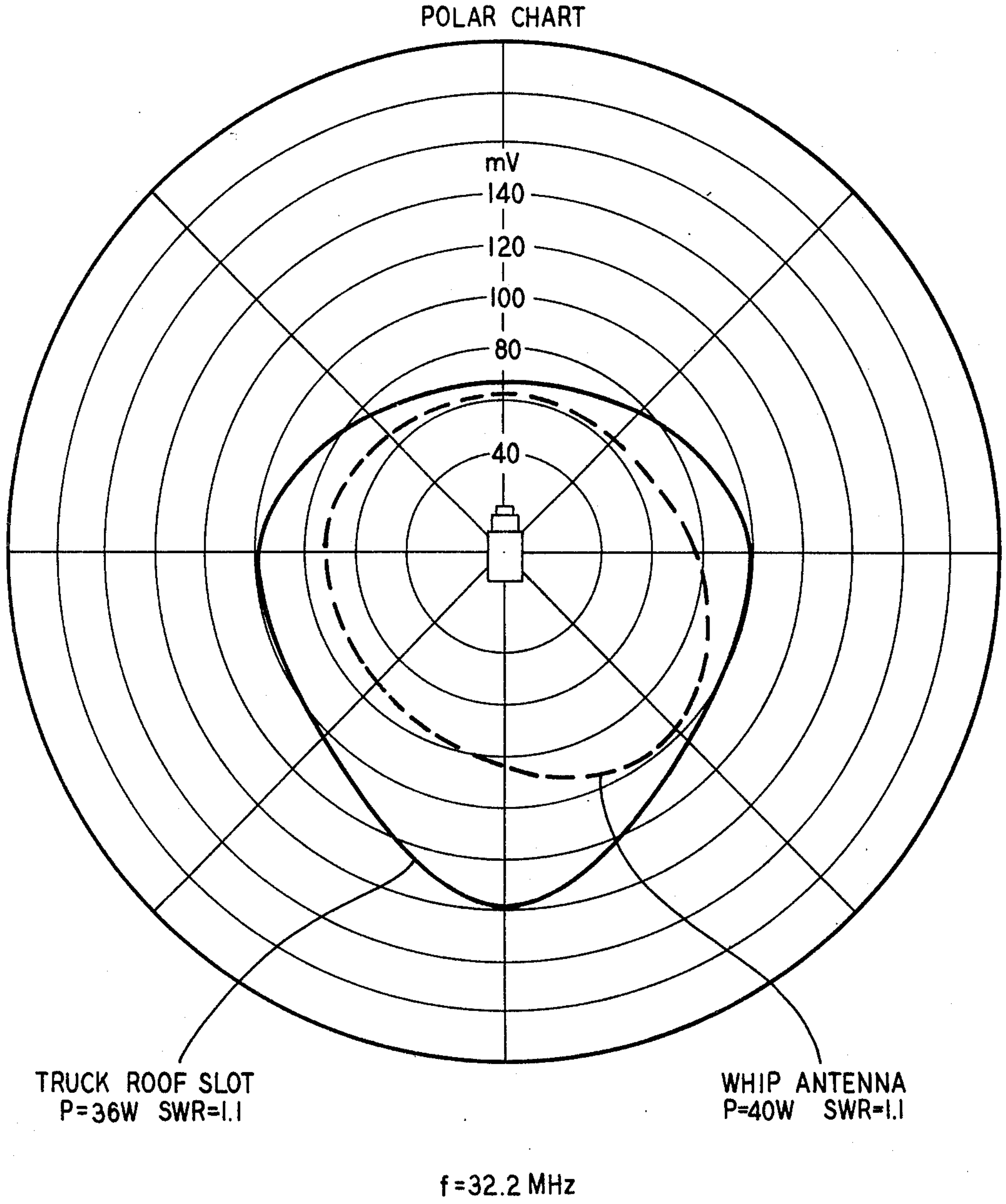
FIGS. 3–6 are polar radiation diagrams for the antenna shown in FIGS. 1 and 2 for a variety of excitation conditions.
Figure 4:
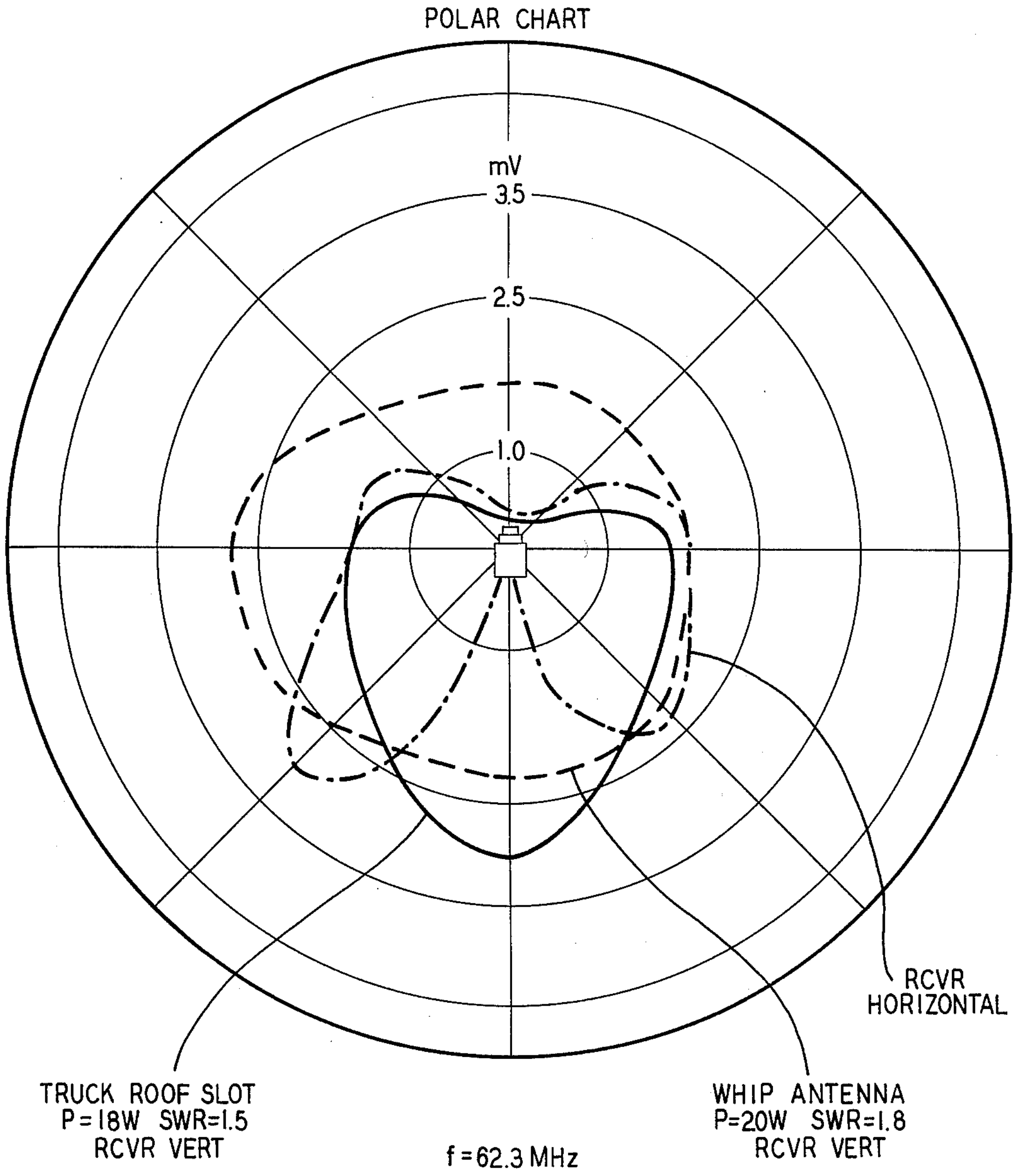
Figure 5:
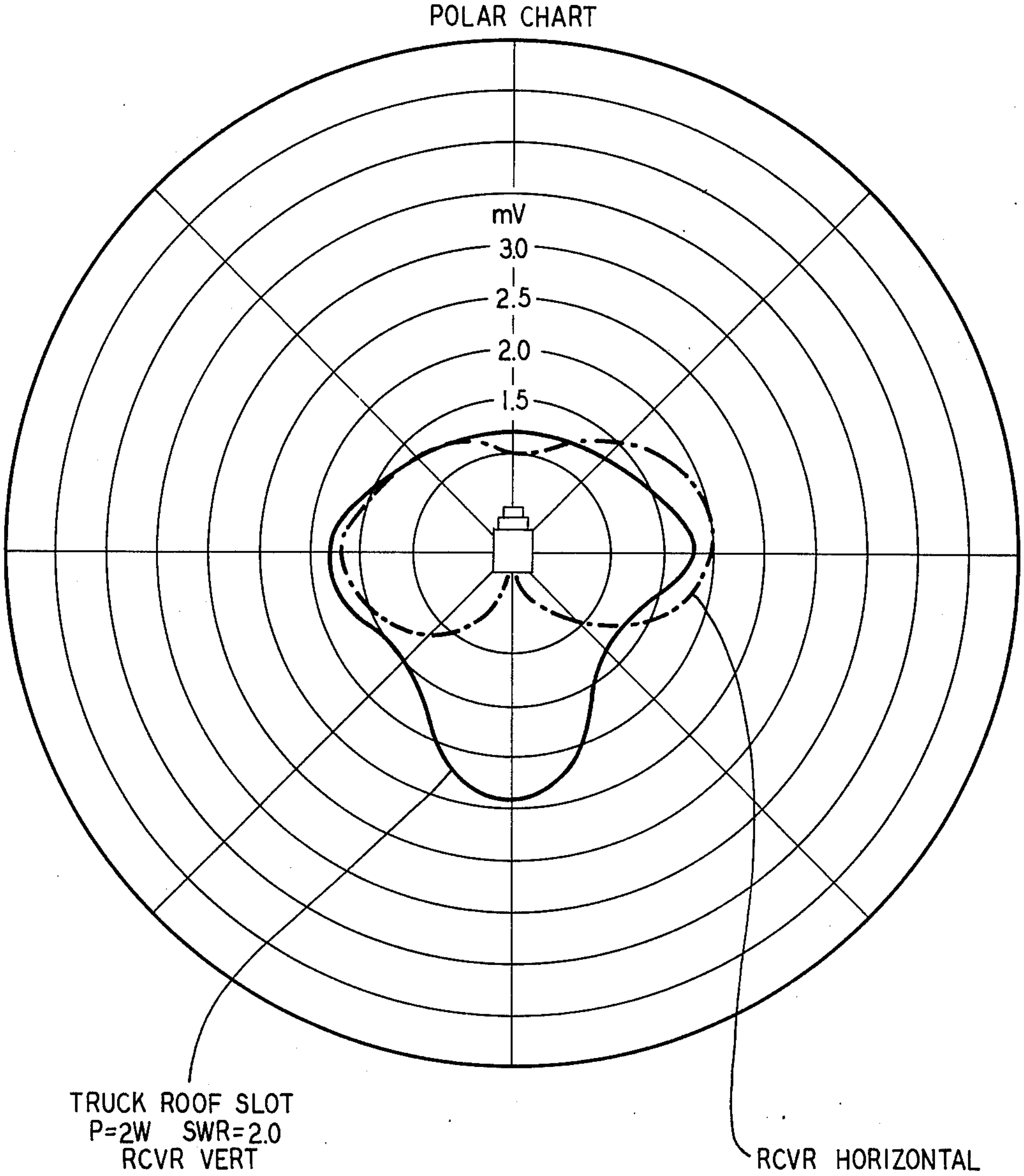
Figure 6:
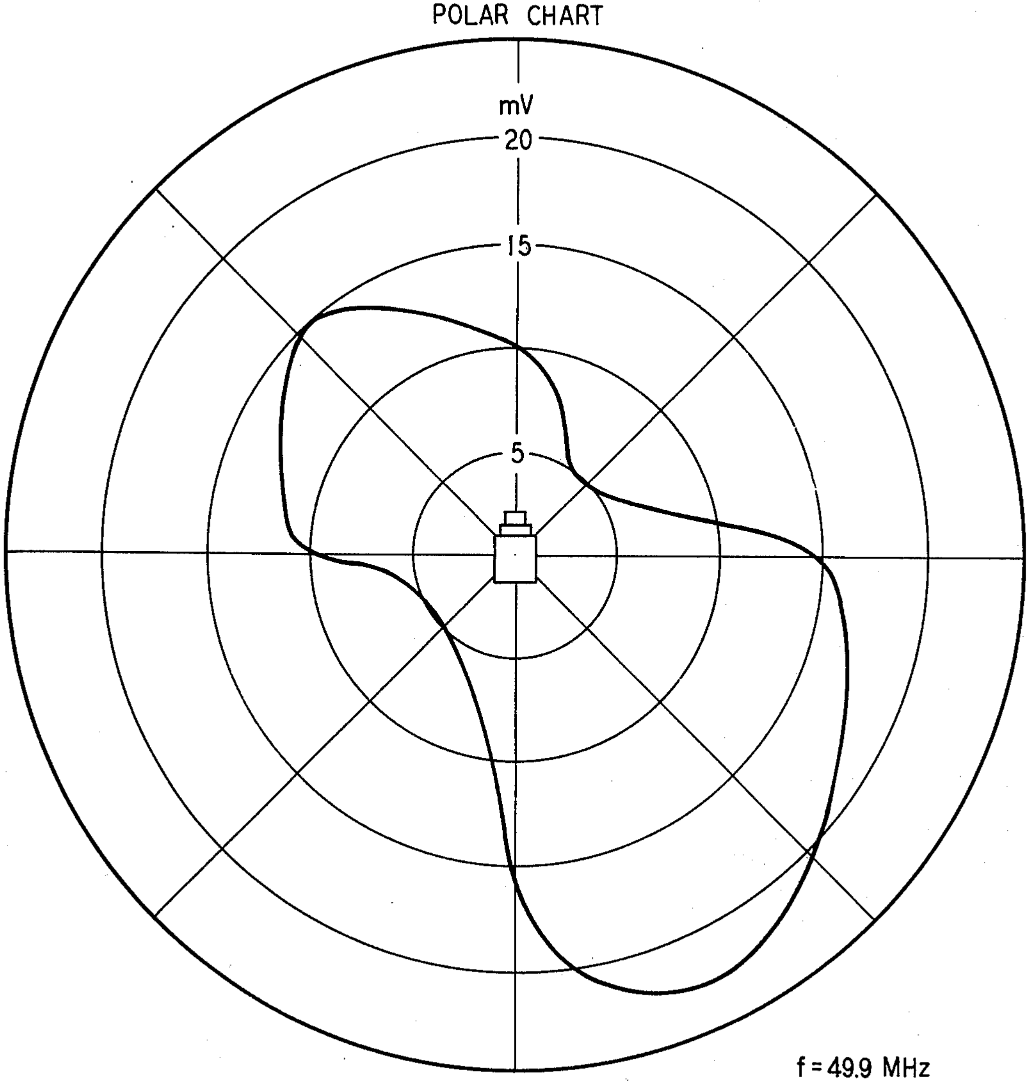

It is, however, more instructive to consider the coupling transformer action of the false roof-slot structure and the radiating action of the vehicle. FIG. 3 compares the radiation pattern of the false roof slot-coupled vehicle shown in FIGS. 1 and 2 with a standard 2.88 meter high whip antenna at a frequency of 32.2 MHZ. Both patterns in FIG. 3 were measured using the same type of whip antenna as a receiver antenna. It is apparent from FIG. 3 that the vertically polarized radiation from the false roof slot-coupled vehicle exceeds that of the whip in all directions, i.e., the false roof slot-coupled vehicle acts like a somewhat more efficient whip antenna. It will be appreciated that a conventional cavity-tuned slot antenna radiating through its aperture in the horizontal roof plane could not possibly produce such a vertically polarized field along the ground. Such a conventional slot antenna would radiate mostly in a direction which is perpendicular to its aperture; that is skyward. The reason for the whip-like, vertically polarized, radiation from the false roof slot-coupled vehicle will be seen by considering the E and H field distribution that is established in the U-shaped slot when the slot is fed at its center. The E and H field inside the left and right legs of the U-shaped slot will be in phase and, thus, force surface currents to flow down along the vertical sides of the vehicle instead of across the horizontal surface of the roof. However, it follows that with increasing frequency the E and H field in the left and the right legs of the U-shaped slot will become out of phase. Thus, the surface currents will be forced to flow between the left and right legs of the U-shaped slot, across the horizontal roof; consequently, with increasing frequency, vertically polarized radiation from the surface currents along the vertical surfaces of the vehicle will be reduced at the expense of increased horizontally polarized radiation from the surface currents on the horizontal roof. This radiation mechanism is supported by the radiation patterns at increased frequencies 62.3 MHZ and 70.0 MHZ which are shown in FIGS. 4 and 5. Obviously, one can manipulate to some extent the surface current distribution on the vehicle by phasing the E and H field in the slot using external reactive loading along the slot in conjunction with the slot feed location. By this means one can emphasize the flow of surface currents along one part of the vehicle and deemphasize the flow of surface currents along other parts of the vehicle and achieve differently shaped radiation patterns. For example, by interchanging the center feed and corner tuning points of the slot the figure-8 shaped pattern shown in FIG. 6 was obtained at 49.9 MHZ.

The interchange of the feed and tuning points and the corresponding change in the shape of the radiation pattern was accompanied by only a small change in the SWR, e.g., from 1.0 to 1.5, a change which is readily compensated by slightly retuning the tuning circuit. Comparing the patterns shown in FIGS. 3–5 and in FIG. 6, one notices that the overall radiation level is lower in the latter case, i.e., when the transmitter feeds the slot corner rather than the center.

It is well known that for RF conductors, sharp corners and edges must be avoided as these corners and edges are responsible for the generation of spurious field modes and eddy currents, which lower the radiation efficiency of the antenna structure. It is evident that the RF losses from corner and edge effects were more pronounced when the slot corner was fed rather than the slot center.

Although not effectuated in the experimental embodiment actually built and tested, one skilled in the art will appreciate how the edges and corners of the slot could be rounded to minimize these spurious field modes and eddy currents.

It will also be appreciated that the invention is not limited to trucks having rectangular shelters thereon but may also be employed with personnel carriers and automobiles having rounded roofs; indeed, it may be used with any vehicle, civilian or military.

Also, one skilled in the art will appreciate how various changes and modifications may be made to the arrangement and structure shown, without departing from the spirit and scope of the invention.

What is claimed is:

1. In combination with a vehicle, or the like, having a metal body, an antenna which comprises:

a false, metal roof substantially co-extensive and parallel with the roof of said body, but spaced apart therefrom, said false roof having:

a U-shaped slot parallel to the left, right and rear edges of said false roof;

means for energizing said slot with a source of r.f. energy; and antenna tuning means connected to said slot for producing a controlled radiation pattern at the frequency of interest by surface currents induced in said vehicle.

2. The antenna according to claim 1 where $$d >> \lambda$$

where $d$ = the spacing between said roof and said false roof and $\lambda$= the wavelength of interest.

3. The antenna according to claim 1 wherein said tuning means is coupled to the left and right corners of said slot and said energizing means is coupled to the point of said slot midway between said left and right corners.

4. The antenna according to claim 1 wherein said energizing means is coupled to at least one of the corners of said slot and said tuning means is coupled to said slot midway between the left and right edges thereof.

5. The antenna according to claim 1 wherein said tuning means and the dimensions of said slot are selected such that surface currents are forced to flow in the vertical sides of said vehicle whereby said vehicle radiates a substantially vertically polarized signal.

6. The antenna according to claim 1 wherein said tuning means and the dimensions of said slot are selected such that surface currents are forced to flow across the horizontal surface of said false roof whereby said vehicle radiates a substantially horizontally polarized signal.

* * * * *